United States Patent [19]
Bottenberg

[11] 3,767,223
[45] Oct. 23, 1973

[54] VEHICLE SUSPENSION SYSTEM
[75] Inventor: Warren E. Bottenberg, Holton, Kans.
[73] Assignee: B-M-B Company, Inc., Holton, Kans.
[22] Filed: Oct. 22, 1971
[21] Appl. No.: 191,600

[52] U.S. Cl. ............. 280/106.5 R, 16/180, 280/283
[51] Int. Cl. ........................................... B62d 21/18
[58] Field of Search .......................... 280/106.5, 283; 267/60; 16/190, 185 H, 180, 85

[56] References Cited
UNITED STATES PATENTS
2,939,721   6/1960   Smith et al. ................... 280/106.5 R
2,620,509   12/1952  Keating ................................ 16/190

FOREIGN PATENTS OR APPLICATIONS
283,749   1/1928   Great Britain .......................... 16/85

Primary Examiner—Philip Goodman
Assistant Examiner—John A. Carroll
Attorney—Lane, Kakjer, Kircher, Wharton & Bowman

[57] ABSTRACT

Suspension system for a three wheeled vehicle includes interconnecting the front frame and the rear frame with a spring loaded hinge structure. The hinge structure is comprised of a pair of hinge plates, a hinge barrel and an interconnecting hinge pin. The front frame is connected to one of the hinge plates while the rear frame is connected to the other of the hinge plates. At least one cap screw extends through both hinge plates and has a compression spring circumscribing a substantial portion thereof on the hinge plate side that is opposite the screw head or cap. An adjustable nut and a washer combination affixes the compression spring between one of the hinge plates and the screw end so that the strength of the spring may be varied in accordance with the position of the hex lock nut. This construction permits the front and rear frame to articulate about the hinge pin under the spring of the strength of one or more of the compression springs and substantially absorbs much of the shock that may otherwise accompany the vehicle movement over rough irregular terrain.

Another embodiment of the invention includes spring loading the wheel forks of a trailer structure by providing a substantially upright stationary plate on the trailer frame and spring loading a movable plate which is attached to the trailer wheel mounting fork. At least one screw extends through both plates with an adjustable compression spring being located on the plate side opposite the screw hex head. In this manner, the road shock is absorbed in the wheel suspension system for the trailer structure.

4 Claims, 9 Drawing Figures

INVENTOR
Warren E. Bottenberg

BY Scofield, Kokjer, Scofield + Lowe
ATTORNEYS

INVENTOR
Warren E. Bottenberg

BY Scofield, Kokjer, Scofield & Lowe
ATTORNEYS

VEHICLE SUSPENSION SYSTEM

BACKGROUND AND BRIEF DESCRIPTION OF THE INVENTION

Prior art three wheeled vehicles have been in existence for some time and often approximate a motorcycle type ride with flotation tires on the rear thereof for "dune buggy" type use. The "three wheeler" will generally include a front fork for the single front wheel, an integral tubular frame extending from the fork to a rear axle which spans the rear end thereof and facilitates the powering (usually by a conventional gasoline motor) and mounting of a pair of rotation tires thereon.

Since it is normally expected that such a three wheeled vehicle is to be used in rugged terrain or in beach areas and driven on and over sand dunes, rough country roads and fields, the rigid integral frame construction of same imparts considerable shock to the driver. This became an acentuated problem when the "three wheeler" was used to "jump" over an incline as in hill racing or beach dune driving so that it would completely leave the ground in flight and land with a resounding jolt to the driver even though padded seat cushions may be used.

The subject invention relates primarily to a unique three wheeled vehicle suspension system but also pertains to a suspension system having utility with other vehicles (generally two or more wheels) including towed trailer structures. The principal embodiment attaches the front and rear frames of a three wheeled vehicle by hingedly connecting same to articulated hinge plates. The front frame will be weldedly attached to the front hinge plate while the rear frame is weldedly attached to the rear hinge plate. At least one (and in most cases three) cap screw extends through both hinge plates at their lower edge portion thereof. These cap screws have a hex head on one end thereof and are of sufficient length to accommodate compression springs being fixedly located on the other end thereof by an adjustable locking means. The location of this hinged frame interconnect is slightly forward of the center gravity of the three wheeled vehicle when the driver is seated thereon. As the vehicle moves across rough irregular terrain, the front frame is permitted to hingedly move against the strength of the compression springs to absorb the normal road shock as well as exceedingly hard jolts to the frame structure. The springs are of sufficient strength to return the hinged frame interconnect so that the two hinge plates are in close proximity to each other along their substantially vertical flat surfaces.

A second embodiment includes a trailer structure for transporting three wheeled vehicles of the character described above. Each trailer wheel is mounted on a wheel fork that is supported from a hollow bearing. Each bearing has a plate extending vertically upwardly therefrom that will be in close proximity to a corresponding fixed plate which is weldedly attached to the trailer frame structure. Usually a pair of cap screws will extend through the aligned openings in the two plates with compression springs being located on the end portion of the cap screws past the rear vertical face of fixed plate. In this manner, shock is absorbed by the wheel fork being moved against the strength of the compression spring on the hollow bearing. Accordingly, the trailer may be towed behind conventional prime mover such as a sedan or station wagon and no significant road shock is imparted to the associated load.

A primary object of the invention is to provide a uniquely constructed vehicle suspension system.

Another object of the invention is to provide a vehicle suspension system that not only enhances the comfort of the driver of a three wheeled vehicle but also increases the driving safety thereof. It is an important feature of this object that many such three wheelers are either raced or driven at relatively fast speeds across rough and irregular terrain without a provision to absorb the normal shock condition which is translated via the vehicle frame to the driver's body. The subject invention accordingly operates to absorb the shock and to protect the spine as well as other vital and sensitive portions of the driver's body.

A further object of the invention is to provide an inexpensive and easy to manufacture vehicle suspension system that improves the comfort and safety of the vehicle, its passengers, or contents.

A still further object of the invention is to provide a unique suspension system for these vehicles of various types including three wheeled vehicles and trailers and which is easily adjustable to compensate for either the normal wear of the associated spring parts or for the varying terrain which the vehicle may be utilized upon.

A further object of the invention is to provide a rugged durable and easy to manufacture and assemble spring loaded shock suspension system that hingedly connects two vehicle frame portions and use compression springs to resist the hinge movement and for shock absorbing techniques.

DETAILED DESCRIPTION OF THE INVENTION

In the accompanying drawings, which form a part of the specification and are to be read in conjunction therewith and in which like reference numerals indicate like parts in the various views.

Figure 1:
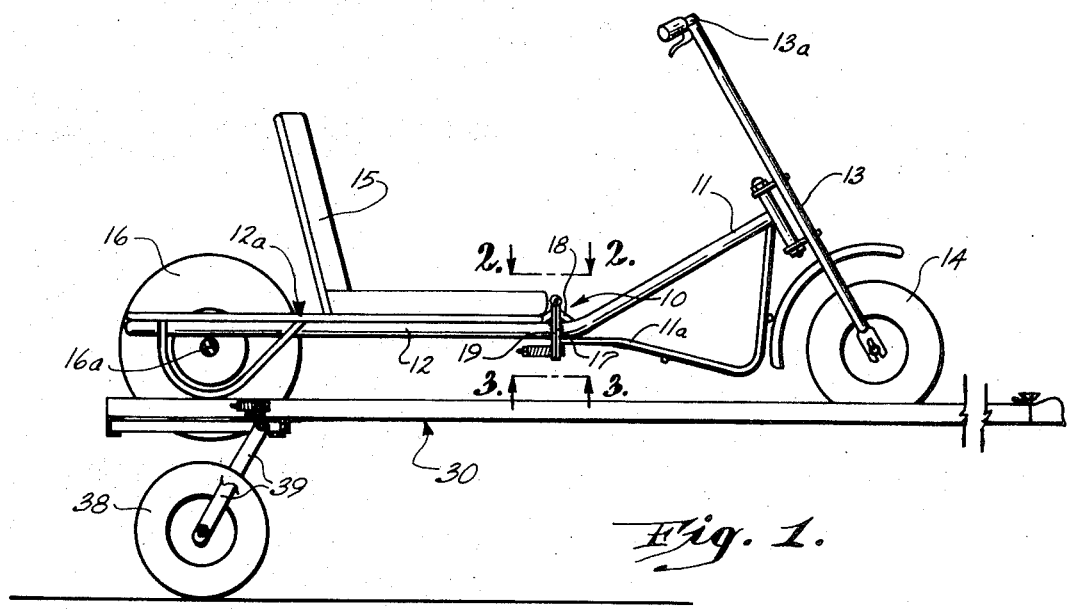
FIG. 1 is a side elevational view of a three wheeled vehicle utilizing the subject suspension system mounted on a trailer for said vehicle which likewise utilizes a form of the invention.
Figure 2:
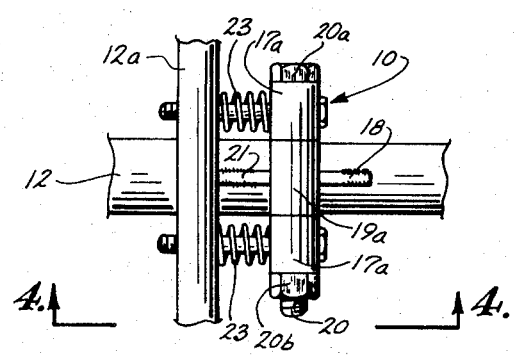
FIG. 2 is an enlarged top plan view of the suspension system looking along the line 2—2 of FIG. 1 in the direction of the arrows and with the seat cushion removed.
Figure 3:
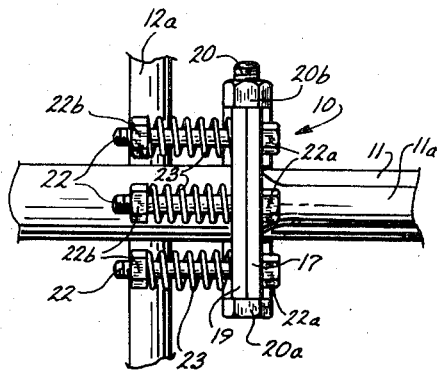
FIG. 3 is an enlarged bottom elevational view taken generally along the lines 3—3 of FIG. 1.
Figure 5:
FIG. 5 is a sectional view of the left hand portion of the suspension system shown in FIG. 4 and taken generally along the line 5—5 of FIG. 4 in the direction of the arrows.
Figure 4:
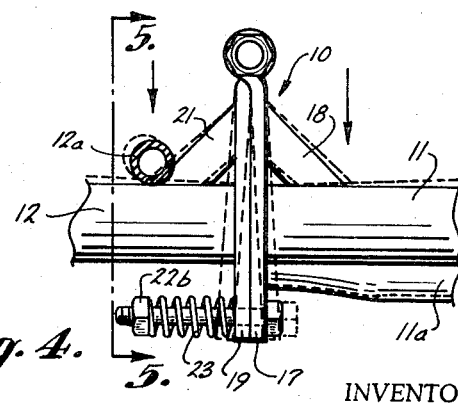
FIG. 4 is an enlarged side elevational view of the suspension system hinged interconnect shown in FIG. 1 and with the broken lines indicating the position occupied by the frame when a resulting downward force is applied thereto.

Turning now more particularly to the drawings, the subject suspension system as utilized on a three wheeled vehicle is generally indicated by the numeral 10 in FIGS. 1–5 and 9. The basic portions of the three wheeled vehicle include the front frame 11 and the rear frame 12. The front frame actually includes a contoured reinforced tubular member 11a which also interconnects with the front fork 13 (as does the larger tubular member 11). Wheel 14 is conventionally affixed to the front fork with handle bars 13a conveniently reachable from the seat location for steering purposes.

The rear frame 12 extends rearwardly from the suspension system and will include a tubular frame structure 12a for supporting the cushioned seat 15 and a portion of the gasoline motor to the rear thereof. Wheels 16 are attached on the outer end portions of axle 16a, some being powered by the above mentioned gasoline motor (not shown) in the conventional manner.

Returning once again to the suspension system, the front frame including the tubular frames 11 and 11a are weldedly attached to the forward vertical face of a hinge plate hereinafter identified by numeral 17. For additional reinforcing, a gusset 18 is weldedly interconnected between the upper surface of an adjacent horizontal portion of the tubular frame member 11 and the upper face of the hinge plate 17. The upper end portions of 17 are curled at 17a to form the outer two-thirds of the hinge barrel for the interconnect.

A hinge plate 19 is oppositely oriented and will have a central portion 19a cooperating with the barrel portions 17a to accommodate the hinge pin 20 therethrough. The pin 20 has a hex head 20a and an externally threaded opposite end portion which facilitates the utilization of a lock nut 20b thereby securely affixing both hinge plates but permitting the articulated movement thereof. The rear hinge plate 19 is weldedly attached to the rear frame 12. Gusset 21 weldedly interconnects the upper adjacent surface of the frame 12 to the upper surface of the plate 19 so that the two vehicle frames are interconnected by the hinge structure described above and a later described resilient biasing means.

The suspension system includes a means fo urging the two frame portions to the position shown in FIG. 1 which is a frame orientation that would generally exist but for the presence of the suspension system. To facilitate the aforesaid biasing, both hinge plates are apertured along the lower horizontal edge portion thereof. As shown, three cap screws 22 extend through the apertures with the heads thereof (22a) bearing against the plate portion adjacent the apertures. Compression springs 23 will slidably fit over the three opposite ends of the cap screws with lock nuts 22b securing the springs thereon under any desired degree of tightness. Accordingly, compression springs 23 locate between the rear vertical face of the rear hinge plate 19 and the lock nuts 22b and resiliently resist separation of the hinge plates 17 and 19 about hinge pin 20.

Figure 9:
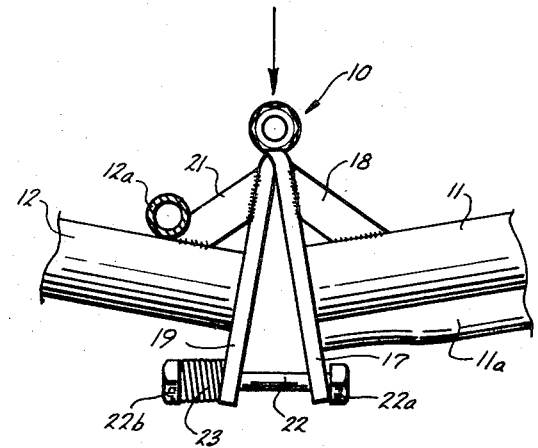
FIG. 9 is an elevational view of the suspension system hinge interconnect shown in FIG. 4 but with a resultant downward force applied thereto by separating the two hinge plates.

From the above it may be seen that the suspension system generally indicated by numeral 10 will permit front frame 11 and rear frame 12 to separate under the force of the compression springs 23. In this fashion, rough or irregular terrain encountered by the three wheeled vehicle described above will cause frame 11 to be moved in an upward direction, frame 12 moved downwardly and the hinged plates 17 and 19 to separate at their lower portion as shown in FIG. 9. Accordingly, springs 23 are compressed absorbing the road shock and eventually urge the plates (and interconnected frame portions) to be returned to the FIG. 1 frame orientation.

It is possible to attach a C-clamp or the like to the hinge plate 17 and 19 and to thereby preclude utilization of the suspension system in its intended manner. Furthermore, the lock nuts 22b enable the user to adjust the spring load on the suspension system in accordance with the type terrain about to be negotiated by the vehicle or to facilitate an adjustment in case of loss of spring strength.

A second embodiment of my invention is disclosed in FIGS. 1 and 6–8. As shown therein, a trailer for the above-described vehicle is generally indicated by the numeral 30. Trailer 30 is generally comprised of the elongated tongue 31 with a trailer hitch attachment 32 on the forward end thereof. The rear end portion of the trailer has a rectangularly shaped vehicle rear wheel support 33 integrally attached thereto. The support 33 is constructed of spaced apart channel structurals 34 which are oriented transversely to longitudinal center line of tongue 31. The end portions of the structurals are interconnected by the wheel section generally indicated by the numeral 35 with each structure having two shorter structurals 35a spanning the end portions of structurals 34. Numeral 36 depicts the deck area inside structural 35a. The support structure 33 is open between the inner structurals 35a (as indicated at 36a) and the tongue 31 so that the flotation tires (rear tires 16) of the three wheeled vehicle described above may be lodged therein between structurals 34. In a similar manner, the tongue 31 is substantially U-shaped in section with the U-channel area being open at the upper surface thereof to accommodate the front wheel 14 of one of the vehicles.

Figure 6:
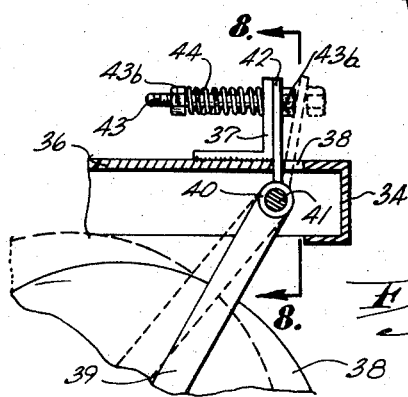
FIG. 6 is a sectional view of the suspension system for the wheel fork of the trailer shown in FIG. 1.
Figure 7:
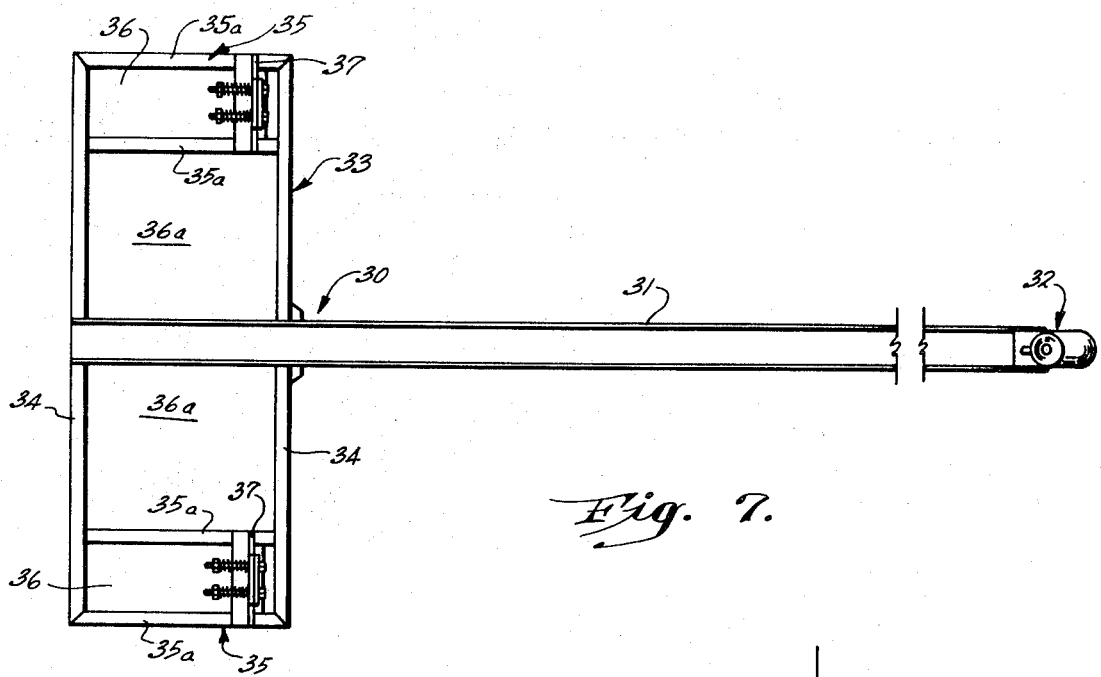
FIG. 7 is a top plan view of the trailer for the three wheeled vehicle shown in FIG. 1.
Figure 8:
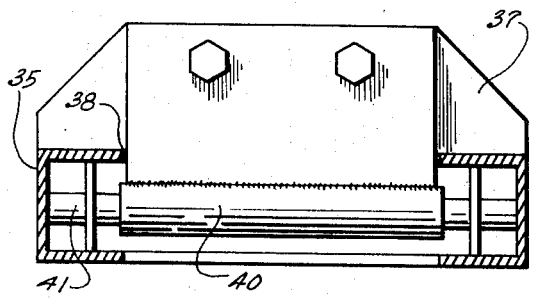
FIG. 8 is a sectional view of the right hand portion of the trailer suspension system taken generally along the line 8—8 of FIG. 6 in the direction of the arrows.

Returning now more particularly to the trailer wheel supports 35, the deck portion of each of the supports 35 has been indicated by numeral 36. An angle bracket with the vertical upstanding plate 37 is weldedly connected to deck 36 and is immediately adjacent the forward termination of the deck so that a space 38 exists between the deck and the forward channel structural 34. Each one of the trailer wheels 38 is mounted on a wheel fork 39 and has at its upper end portion thereof a hollow bearing 40 rotatable about a fixed shaft 41 which is weldedly attached between the vertical sides of the structurals 35a in each wheel mounting section 35. As shown in FIG. 6, the bearing shaft combination is located below the rearward limit of opening 38 (also the forward edge of deck 36). A plate 42 is weldedly attached to hollow bearing 40 at the upper surface thereof it will extend upwardly through opening 38 and is positionable with its rear face flush against the forward central surface of the bracket plate 37. In this manner, the plate 42 and the vertical bracket plate 37 are suitably apertured so that cap screws 43 may extend therethrough with the head of the screws (43a) bearing against the forward outer surface of plate 42. Finally, compression springs 44 slidably fit over the cap screws 43 and are located thereon (in compression) by the adjustable lock nuts 43b. In this manner the springs (44) bear against the rearward surface of vertical portion of bracket 37 and tend to urge plate 42 against plate 37.

In operation, the up and down movement of wheel 38 is translated via the fork 39, movable hollow bearing 40 to plate 42. Since the compression springs 44 bias plate 42 towards the vertical bracket plate 37, the wheel generally assumes the solid line position shown in FIGS. 1 and 6. However, when irregular or rough terrain is encountered, the wheels 38 will have this road shock absorbed by the compression springs 44 and will thereby be permitted to fluctuate between the broken line position (shown in FIG. 6) to the solid line position also indicated therein. Of course, when wheels 38 are accordingly moved by encountering rough terrain, plate 42 likewise will assume the broken line position shown in FIG. 6 and compression spring 44 will be compressed an equal amount. When the road shock is dissipated, compression spring 44 returns plate 42 to the solid line position and this movement is translated via the hollow bearing in the wheel fork to relocate wheel 38 without having transmitted the shock to the trailer or vehicle indicated thereon.

As discussed with respect to the first embodiment of the suspension system, it is possible to utilize appropriate C-clamps on the combined plates 37 and 42 to lock same in the substantially upright or vertical position thereby precluding the spring action discussed above.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A vehicle suspension system, said system comprising a front vehicle frame portion, a rear vehicle frame portion means interconnecting and offset from said vehicle frame portions thereby forming an integral vehicle frame with a wheel base of a preselected length, and means for resiliently biasing said interconnecting means to a preselected position, said resilient biasing means operable to absorb shock normally associated with said vehicle movement in rough terrain, said interconnecting means and said resilient biasing means cooperating to prevent said wheel base from becoming less than said preselected length, said interconnecting means being constructed to permit said frame portions to separate as said interconnecting means is moved against the biasing means thereby facilitating the maintaining of the preselected wheel base length.

2. The combination as in claim 1 wherein said interconnecting means includes a hinge structure, said hinge structure having a first plate interconnected with said front frame portion, a second plate, said second plate interconnected with said rear frame portion, said resilient biasing means operable to bias said plates to a preselected position, said hinge structure being constructed to pivotally connect said plates together at a preselected edge portion and to permit separation of said plates against the bias of said resilient biasing means at another edge portion.

3. The combination as in claim 2 wherein said resilient biasing means include at least one compression spring mounted with respect to said plates so that said plates are urged toward each other.

4. The combination as in claim 3 wherein said resilient biasing means and the mounting of said compression spring includes an aperture in each of said plates, at least one elongated spring mounting member extending through both of said apertures; said compression spring being located on said elongated spring mounting member and in biasing contact with one of said plates to thereby constantly urge said plates toward each other.

* * * * *